United States Patent
Yoon et al.

(10) Patent No.: US 8,834,077 B2
(45) Date of Patent: Sep. 16, 2014

(54) MICRO DRILL AND METHOD OF FABRICATING THE SAME

(75) Inventors: Tae Sik Yoon, Seonnam-si (KR); Soon Jin Cho, Suwon-si (KR); Seung Hyun Cho, Seoul (KR); Jae Joon Lee, Suwon-si (KR)

(73) Assignee: Bestner Inc., Seongnam-Si, Gyeonggi-Do (KR)

( * ) Notice: Subject to any disclaimer, the term of this patent is extended or adjusted under 35 U.S.C. 154(b) by 920 days.

(21) Appl. No.: 13/003,293

(22) PCT Filed: Jun. 23, 2009

(86) PCT No.: PCT/KR2009/003353
§ 371 (c)(1),
(2), (4) Date: Apr. 8, 2011

(87) PCT Pub. No.: WO2010/005193
PCT Pub. Date: Jan. 14, 2010

(65) Prior Publication Data
US 2011/0182684 A1 Jul. 28, 2011

(30) Foreign Application Priority Data
Jul. 8, 2008 (KR) .................. 10-2008-0065980

(51) Int. Cl.
*B23B 51/02* (2006.01)
*B23P 15/32* (2006.01)
(Continued)

(52) U.S. Cl.
CPC ............... *B22F 7/062* (2013.01); *B23B 51/02* (2013.01); *C22C 38/08* (2013.01); *B23P 15/32* (2013.01); *B22F 2998/00* (2013.01); *B23B 2251/426* (2013.01); *B22F 2005/001* (2013.01)
USPC ........... 408/1 R; 408/144; 408/226; 408/230; 76/108.1

(58) Field of Classification Search
CPC .. B23B 2251/426; B23B 51/00; B23B 51/02; B23B 2222/28; B23B 2222/61; B23B 2270/54
USPC ......... 408/1 R, 226, 230, 144, 231; 76/108.1, 76/108.6
See application file for complete search history.

(56) References Cited

U.S. PATENT DOCUMENTS 1,887,372 A * 11/1932 Emmons ..................... 408/144
2,334,755 A * 11/1943 Eglinton ...................... 433/165
(Continued)

FOREIGN PATENT DOCUMENTS

| JP | 63-306839 A | 12/1988 |
|---|---|---|
| KR | 10-1993-0003290 B1 | 4/1993 |

(Continued)

OTHER PUBLICATIONS

International Search Report dated Feb. 9, 2010, for International Application No. PCT/KR2009/003353 (2 pages).

(Continued)

*Primary Examiner* — Eric A Gates
*Assistant Examiner* — Paul M Janeski
(74) *Attorney, Agent, or Firm* — Knobbe Martens Olson & Bear LLP

(57) ABSTRACT

A method of fabricating a micro drill, which includes a drill part for machining a hole and a shank part fixed to a motor, the drill part and the shank part being made of different materials. The method includes the steps of forming a drill part-forming powder compact having a recess in one end thereof, and forming a shank part-forming powder compact having a protrusion, the protrusion intended to be fitted into the recess of the drill part-forming powder compact, forming an assembly of the drill part-forming powder compact and the shank part-forming powder compact, with the protrusion fitted into the recess, and simultaneously sintering the assembly of the drill part-forming powder compact and the shank part-forming powder compact.

5 Claims, 4 Drawing Sheets

(51) Int. Cl.
*C22C 38/08* (2006.01)
*B22F 7/06* (2006.01)
*B22F 5/00* (2006.01)

(56) References Cited

U.S. PATENT DOCUMENTS

| | | | | |
|---|---|---|---|---|
| 2,354,656 | A | * | 8/1944 | Annesley ........................ 403/280 |
| 3,670,416 | A | * | 6/1972 | Kroder ........................... 433/165 |
| 3,738,063 | A | * | 6/1973 | Cupler, II ....................... 451/143 |
| 4,135,847 | A | * | 1/1979 | Hemmings ..................... 408/226 |
| 4,383,784 | A | * | 5/1983 | Gulbrandsen .................. 408/144 |
| 4,679,971 | A | * | 7/1987 | Maier ............................. 408/145 |
| 4,713,286 | A | * | 12/1987 | Bunting et al. ................ 428/323 |
| 4,880,707 | A | * | 11/1989 | Kohno et al. .................. 428/565 |
| 4,887,496 | A | | 12/1989 | Kobayashi |
| 5,927,912 | A | * | 7/1999 | Mihai et al. ................... 408/226 |
| 6,058,807 | A | | 5/2000 | Fujii et al. |
| 6,200,076 | B1 | * | 3/2001 | Fujii et al. ..................... 408/226 |
| 6,511,265 | B1 | * | 1/2003 | Mirchandani et al. .......... 407/53 |
| 8,333,132 | B2 | * | 12/2012 | Shimoda et al. ............. 76/108.6 |
| 2002/0182021 | A1 | * | 12/2002 | Hsieh .............................. 408/144 |
| 2003/0002940 | A1 | * | 1/2003 | Forth et al. .................... 408/226 |
| 2003/0082020 | A1 | * | 5/2003 | Lin et al. ........................ 408/144 |
| 2003/0118413 | A1 | * | 6/2003 | Bruhn et al. ................... 408/144 |
| 2011/0195377 | A1 | * | 8/2011 | Sun et al. ....................... 433/165 |

FOREIGN PATENT DOCUMENTS

| | | |
|---|---|---|
| KR | 10-1998-0070951 A | 10/1998 |
| KR | 10-0519647 B1 | 10/2005 |

OTHER PUBLICATIONS

Written Opinion of International Searching Authority dated Feb. 9, 2010 from PCT/KR2009/003353 (4 pages).

* cited by examiner (1) SHANK PART CUTTING (2) COUPLING BETWEEN SUPER-HARD ROD AND SHANK PART (3) OUTER DIAMETER MACHINING (4) DRILL BLADE MACHINING (1) POWDER COMPACT PREPARATION (2) POWDER COMPACT ASSEMBLYING (3) SINTERING (4) DRILL BLADE MACHINING (a)

(b)

(c)

MICRO DRILL AND METHOD OF FABRICATING THE SAME

TECHNICAL FIELD

The present invention relates to a micro drill, which is used for machining micro holes in a Printed Circuit Board (PCB), a precise mold, etc., and a method of fabricating the same, and more particularly, to a micro drill and a method of fabricating the same, in which a shank part, which supports a drill part, is made of a material that is different from that of the drill part.

BACKGROUND ART

Although electric discharge, supersonic waves, a laser, and the like can be used to machine a micro hole, precision machining using a micro drill has been most widely used to date. This is because processing using the micro drill has advantages in that it is used to machine a deeper hole than any other method, produces a hole having excellent precision in straightness, roundness, parallelism, surface roughness, etc., and facilitates a finishing process that follows the machining. In particular, in the electronics and computer industry, micro hole-machining technology is generally used in machining a PCB, a mask, which is used in the fabrication of an Integrated Circuit (IC), etc. In response to the increasing degree of integration of Large-Scale Integrated circuits (LSIs), higher machining precision and higher productivity are required to be realized for various reasons such as the fining of a machining hole, an increase in the depth with respect to the diameter of a machining hole (i.e., the aspect ratio), high density of circuit boards, etc. As the competition to develop micro components in which high functions are integrated is becoming intense, the importance of the micro hole-machining technology is increasing every day.

Such a micro drill is generally divided into a drill part, which machines a hole, and a shank part, which is fixed to a chuck of a high revolution motor. A fabrication method of the related art includes preparing a round rod having a predetermined diameter by sintering a super-hard material and shaping the round rod such that it has a drill part and a shank part. In this fashion, the entire portion of the micro drill is made of the super-hard material. However, the fabrication cost increases if more super-hard material is used, since the super-hard material is expensive. Therefore, in order to reduce the cost, a method of preparing a drill part, which is made of a super-hard material, preparing a shank part, which is made of stainless steel, for example, STS 420J, and coupling the shank part to the drill part made of the super-hard material has been introduced.

As an example of the method of fabricating the micro drill by making the drill part and the shank part of different materials, as shown in FIG. 1, a method of machining a hole 62, into which a super-hard rod 80 can be fitted, in a shank part 60, press-fitting the super-hard rod 80 into the hole 62 at a high temperature using a heating device 70, and finally machining a drill blade 82 is widely used.

This method of the related art can reduce the use of the super-hard material by a certain amount because the shank part is made of stainless steel. However, this method still causes a large amount of loss in the super-hard material, since the final diameter of the machined drill blade 82 is in the range from 0.1 mm to 0.4 mm, whereas the diameter of the super-hard rod 80 is about 1.5 mm. In addition, since the stainless steel used in the shank part is generally a brittle material having high hardness, it is more expensive to form the hole 62, into which the super-hard rod is intended to be fitted, in the shank part 62 than in common steel materials. Furthermore, in order to fit the super-hard rod into the shank part, it is required to finely machine the hole 62 according to the diameter of the super-hard rod. However, it is very difficult to form a fine hole having a diameter of 1 mm or less in the super-hard stainless steel, and heating to a high temperature is required to couple the super-hard hard material to the shank.

DISCLOSURE

Technical Problem

Various aspects of the present invention provide a method of fabricating a micro drill, in which a shank part, which supports a drill part, can be made of a material that is different from that of the drill part, and in which the processing can be simplified.

Also provided is a method of fabricating a micro drill, which can reduce the cost of manufacture by minimizing the waste of an expensive super-hard material.

In addition, also provided are a micro drill and a method of fabricating the same, in which the coupling between the drill part and the shank part is more structurally stable than that of the related art.

Technical Solution

In an aspect of the present invention, the method of fabricating a micro drill, which includes a drill part for machining a hole and a shank part fixed to a motor, the drill part and the shank part being made of different materials, includes the steps of: forming a drill part-forming powder compact having a recess in one end thereof, and forming a shank part-forming powder compact having a protrusion, the protrusion intended to be fitted into the recess of the drill part-forming powder compact; forming an assembly of the drill part-forming powder compact and the shank part-forming powder compact, with the protrusion fitted into the recess; and simultaneously sintering the assembly of the drill part-forming powder compact and the shank part-forming powder compact.

In this method, it is preferred that the size of the inner diameter of the recess formed in the drill part-forming powder compact and the size of the outer diameter of the protrusion formed in the shank part-forming powder compact be determined such that the inner diameter of the recess becomes smaller than the outer diameter of the protrusion after the powder compacts are sintered. The drill part-forming powder compact may be made of at least one selected from the group consisting of tungsten carbide powder, cobalt powder, and cermet powder, and the shank part-forming powder compact may be made of iron-based alloy powder that has a post-sintering hardness of 300 Hv or more. In particular, it is preferred that the drill part-forming powder compact be formed using Powder Injection Molding (PIM). In addition, the drill part-forming powder compact may include a drill blade portion and a connecting portion, the connecting portion having a diameter that is greater than that of the drill blade portion, and the recess may be formed in one end of the connecting portion. After the sintered compact, which is integrated by sintering, is produced, a drill blade may be formed by machining the drill blade portion of the micro drill.

In another aspect of the present invention, the micro drill includes a drill part for machining a hole and a shank part fixed to a motor, the drill part and the shank part being made of different materials. The drill part has a drill blade formed in one end thereof and a recess formed in the other end thereof, and the shank part has a protrusion fitted into the recess of the drill part. The drill part may be formed as a drill part-forming powder compact having a recess formed in one end thereof, and the shank part may be formed as a shank part-forming powder compact having a recess formed in one end thereof. Then, the drill part-forming powder compact and the shank part-forming powder compact may be integrated to each other by being simultaneously sintered, with the protrusion fitted into the recess.

The drill part may include a drill blade portion and a connecting portion, the connecting portion having a diameter that is greater than that of the drill blade portion, and the recess may be formed in one end of the connecting portion. The drill part-forming powder compact contains at least one selected from the group consisting of tungsten carbide powder, cobalt powder, and cermet powder, and the shank part-forming powder compact may contain iron-based alloy powder that has a post-sintering hardness of 300 Hv or more. The recess and the protrusion may have an angled cross section in a portion where they are coupled to each other.

Advantageous Effects

According to the present invention, it is possible to fabricate the micro drill by separately preparing the drill part-forming powder compact and the shank part-forming powder compact using powders of different materials, assembling the powder compacts to each other before sintering, and integrating the powder compacts by sintering them at the same time. Therefore, when compared to the method of the related art, the fabrication process is simplified and the machining cost is reduced, since it is not required to finely machine the stainless steel that is a brittle material.

In addition, when preparing the drill part-forming powder compact, it is possible to adjust the size of the portion that is intended to form the drill blade (i.e. the drill blade portion) in consideration of shrinkage in the sintering process. As a result, the drill blade portion of the final sintered compact has a minimum diameter necessary to form the drill blade. Therefore, when machining the drill blade, it is possible to minimize the waste of the super-hard material, which is expensive, thereby reducing the overall fabrication cost.

Furthermore, in the method of the related art, a hole into which the drill part made of the super-hard material is intended to be fitted has to be formed in the shank part made of the stainless steel. The hole has an extremely low degree of freedom in design, and can be machined only in a circular shape. However, according to the invention, the powder compacts, which are intended to form the drill part and the shank part, can be molded in various shapes, and thus the coupling structure that includes the recess of the drill part and the protrusion of the shank part can be formed in various shapes, for example, an angled shape in order to effectively transfer rotational torque. Accordingly, the invention can provide the micro drill in which the coupling between the drill part and the shank part is more structurally stable than that of the related art.

BEST MODE

Figure 1:
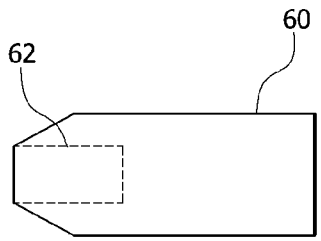
FIG. 1 is a view showing a process of fabricating a micro drill of the related art.
Figure 1:
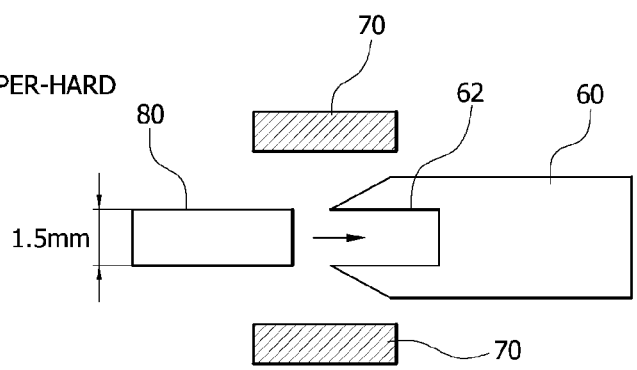
Figure 1:
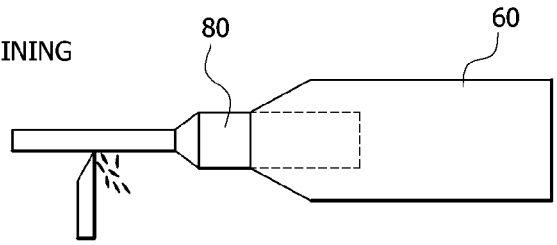
Figure 1:
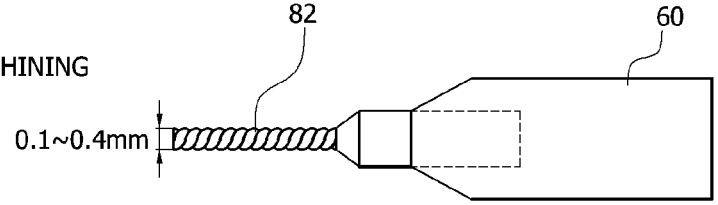

Below, a detailed description will be given of a micro drill and a method of fabricating the same of the invention with reference to the accompanying drawings.

The method of fabricating a micro drill of the invention is a method of fabricating a micro drill, which includes a drill part for machining a hole and a shank part fixed to a motor, the drill part and the shank part being made of different materials. The method includes the steps of: forming a drill part-forming powder compact having a recess in one end thereof, and forming a shank part-forming powder compact having a protrusion, the protrusion intended to be fitted into the recess of the drill part-forming powder compact; forming an assembly of the drill part-forming powder compact and the shank part-forming powder compact, with the protrusion fitted into the recess; and simultaneously sintering the assembly of the drill part-forming powder compact and the shank part-forming powder compact.

Preparation of Powder Compact

First, a mixture for powder sintering, which is intended to form a drill part-forming powder compact, is prepared. For this, in this embodiment, WC-8 wt % Co, in which 8 wt % of Co is added to tungsten carbide (WC) is used as super-hard powder. Here, TiC, TaC, VC, $Cr_3C_2$, or the like can be added in an amount of 1 wt % or less according to use. In addition, cermet can be used as a super-hard material. Although super-hard powder has an average diameter of 0.2 μm, powder having an average diameter less than 1 μm can be added. A binder, which is used for molding, can be added if necessary. In this embodiment, 50 wt % of polyethylene, 45 wt % of paraffin wax, and 5 wt % of stearic acid are used. The ratio of volume of the powder to the binder is 50 to 50. The mixture for powder sintering is prepared using a Banbury mixer, which is heated to 150° C.

Afterwards, a mixture for powder sintering, which is intended to form a shank part-forming powder compact, is prepared. Here, shank part-forming stainless steel STS 4203 powder is used as the powder material for the shank part. In addition, powder of an iron-based ally, such as Fe(2-8)Ni(0.2-0.8)C, STS630, STS440C, or high-speed tool steel, can be used. It is preferred that powder having an average diameter ranging from 7 μm to 15 μm be used. In this embodiment, the average diameter of the powder is 8 μm. In addition, it is preferred that a shank part-forming material having a post-sintering hardness of 300 Hv or more be used. The same binder is used as in the drill part-forming powder compact. That is, 50 wt % of polyethylene, 45 wt % of paraffin wax, and 5 wt % of stearic acid are used. Here, the ratio of the volume of the powder to the binder is 61 to 49. The mixture for powder sintering is prepared using a Banbury mixer, which is heated at 150° C.

Formation of Powder Compact

Afterwards, using the mixtures for powder sintering, the drill part-forming powder compact and the shank part-forming powder compact having respective shapes are formed.

Figure 2:
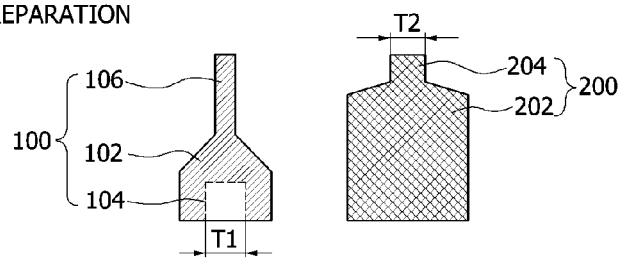
FIG. 2 is a view showing a process of fabricating a micro drill of the invention.
Figure 2:
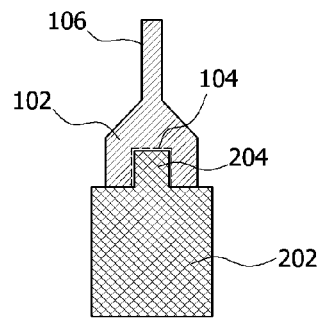
Figure 2:
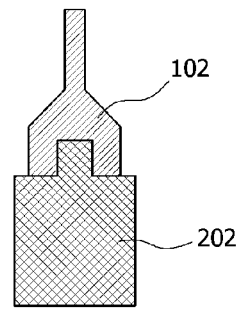
Figure 2:
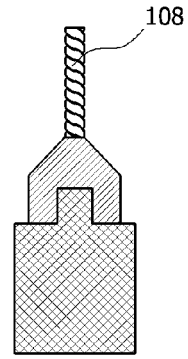

First, referring to the step of "POWDER COMPACT PREPARATION" in FIG. 2, the drill part-forming powder compact 100 is formed in such a shape that it has a recess 104 formed in one end thereof. The drill part-forming powder compact 100 can be configured such that it has a drill blade portion 106 and a connecting portion 102. The drill blade portion 106 is configured such that it has the minimum outer diameter necessary for the machining of a drill blade after a final sintering process. Preferably, the connecting portion 102 with the recess 104 formed in one end thereof has a tapered shape such that the diameter increases in the direction away from the drill blade portion 106.

Figure 3:
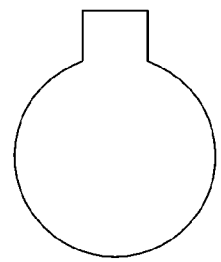
FIG. 3 is a view showing a variety of examples of the cross section of the recess of the drill part and the protrusion of the shank part, which are coupled to each other, in the micro drill of the invention.
Figure 3:
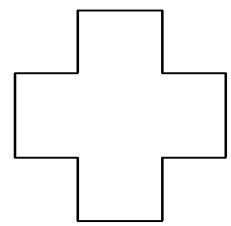
Figure 3:
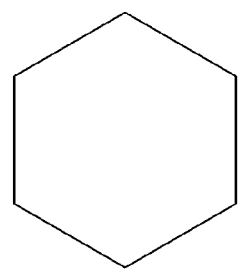

Afterwards, the shank part-forming powder compact 200 is configured such that it has a protrusion 204 formed on one end of a body 202. The protrusion 202 has a shape and a diameter such that it can be fitted into the recess 104. That is, as shown in FIG. 2, the drill part-forming powder compact 100 is configured to surround the contour of the protrusion 204 of the shank part-forming powder compact 200. The diameter of the recess 104 is formed to be smaller than the outer diameter of the body 202 of the shank part-forming powder compact 200 and to be greater than the outer diameter of the protrusion 204. The sizes of the recess 104 and the protrusion 204 are set in consideration of the extent to which the material used for the drill part-forming powder compact 100 and the material used for the shank part-forming powder compact 200 shrink during the sintering process. Furthermore, the cross section of the recess 104 and the protrusion 204, which are coupled to each other, can have a variety of shapes in order to effectively transfer rotational torque of the shank, which is caused by a motor, to the drill part when the drill operates. FIG. 3 shows various examples of the shapes of the recess 104 and the protrusion 204, which can be employed. In particular, all of parts (a) to (c) in FIG. 3 show "angled shapes," in which the part (a) shows a generally circular shape with an angled protrusion formed on a periphery thereof, the part (b) shows a generally crossed shape, and the part (c) shows a hexagonal shape.

Here, it is preferred that the drill part-forming powder compact 100 shown in FIG. 2 be produced using Powder Injection Molding (PIM), i.e. a technology used to produce a net shape. The PIM technology is used to fabricate a three-dimensional net shape, in which substantially no after processing is required, by mixing metal or ceramic powder with binder, forming an injection-molded product from the mixture using a mold, and debinding and sintering the binder. In particular, the injection molding, which has high degree of freedom in design, is preferable, since the recess 104 is formed in one end of the drill part-forming powder compact 100. In the case of the shank part-forming powder compact 200, compression molding can be used instead of the PIM. Here, the shank part-forming powder compact is formed as a rod, followed by machining the protrusion 204. In particular, in the case in which the drill part-forming powder compact 100 and the shank part-forming powder compact 200 are fabricated using the PIM, the recess 104 and the protrusion 204 having various shapes shown in FIG. 3 can be formed more easily with high precision. Furthermore, although the drill part-forming powder compact 100 and the shank part-forming powder compact 200 are formed using respective injection molding processes in this embodiment, the powder compacts can be formed and assembled through a single process using a mold having two powder nozzles. In this case, co-injection molding, in which the drill part-forming powder compact is formed through one nozzle in the state in which the shank part-forming powder compact is first formed through the other nozzle, can be used.

Assembly and Cosintering of Powder Compacts

The powder compacts 100 and 200 are assembled to each other, with the recess 104 of the drill part being fitted into the protrusion 204 of the shank part, and then the assembly is oriented such that the drill part-forming powder compact 100 is placed over the shank part-forming powder compact 200. In this state, the two powder compacts 100 and 200 are subjected to sintering at the same time.

The sintering is, preferably, vacuum sintering. The sintering temperature is suitably in the range from 1300° C. to 1380° C. Here, 1300° C. is the temperature at which the WC—Co alloy used in this embodiment starts to be transformed into a liquid phase, and 1380° C. is the melting point of the stainless steel, the shank material. The sintering time is determined to be 4 hours or less. In the meantime, before the sintering process, a debinding process can be performed in order to remove the binder from the powder compacts. The debinding process can be room-temperature thermal decomposition, which uses nitrogen gas, hydrogen gas, or a gas in which nitrogen and hydrogen are mixed. In addition, solvent extraction, supercritical outflow, decompressing debinding, or the like can be used.

Figure 4:
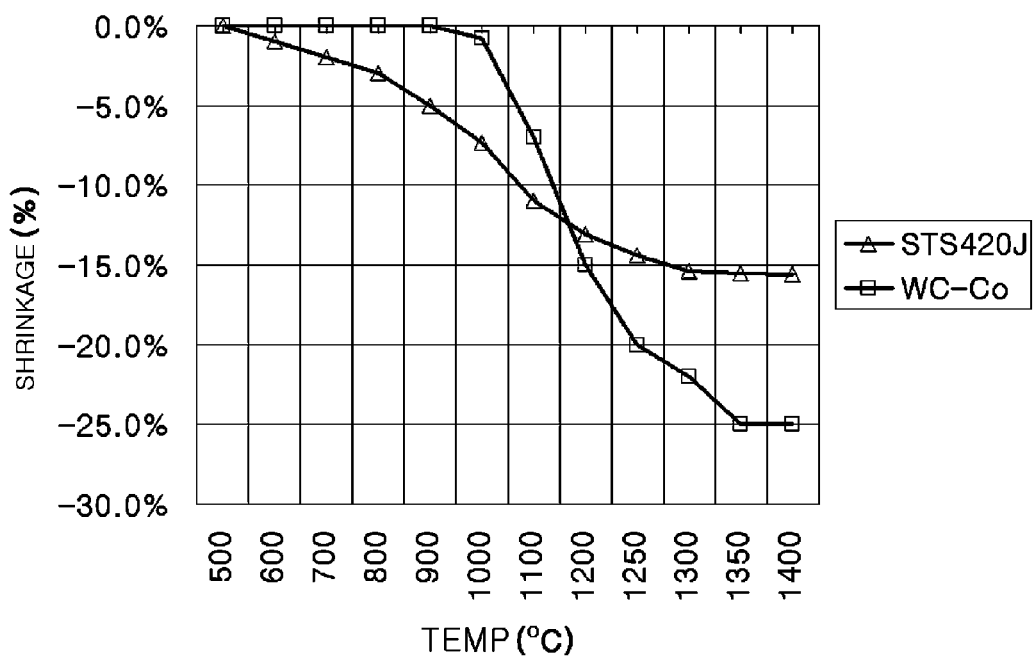
FIG. 4 is a graph showing the shrinking behaviors of the powder compact of tungsten carbide, which is a super-hard material, and the power compact of stainless steel, which is the material of the shank part, according to temperature.

FIG. 4 shows the shrinking behaviors of the super-hard material (WC—Co) of the drill part and the stainless steel (STS 420J) of the shank part according to temperature. As shown in FIG. 4, the contraction of WC—Co of the drill part starts at about 1000° C., and the stainless steel starts sintering contraction at a lower temperature than the super-hard material does. When the drill part-forming powder compact 100 and the shank part-forming powder compact 200 are sintered at the same time, the contraction start temperature of the shank part is lower than that of the drill part. Therefore, it is preferred that the protrusion be formed on the shank part and the recess be formed in the drill part such that the protrusion of the shank part is located inside the recess of the drill part in order to prevent the product from being fractured or damaged during the sintering. Furthermore, if the inner diameter of the recess of the drill part is set to be smaller than the outer diameter of the protrusion of the shank at about 0.01% to 3% after the final sintering process, it is possible to further enhance the coupling force between the drill part and the shank part. In this case, the size T1 of the inner diameter of the recess 104 of the drill part-forming powder compact 100 and the size T2 of the outer diameter of the protrusion 204 of the shank part-forming powder compact 200 can be determined in consideration of the degree to which the sintered drill part-forming powder compact 100 shrinks and the degree to which the sintered shank part-forming powder compact 200 shrinks.

Drill Blade Machining

After the finally sintered compact is formed through the cosintering, a drill blade 108 is produced by machining the drill blade portion 106. Here, since the drill blade portion 106 has the minimum diameter necessary for the machining of the drill blade, it is possible to minimize the waste of the super-hard material compared to the methods of the related art. When the machining of the drill blade is finished, a micro drill is produced as a final product.

Although the exemplary embodiments of the invention have been described hereinbefore, a person having ordinary skill in the art to which the invention pertains can make variations without departing from the spirit of the invention. Therefore, the foregoing descriptions of specific embodiments of the present invention are presented for purpose of illustration and description. The scope of the present invention is not defined by the detailed description as set forth above but by the accompanying claims of the invention. It should also be understood that all alterations or modifications derived from the claims or their equivalents fall within the scope of the invention.

The invention claimed is:

1. A method of fabricating a drill, which includes a drill part for machining a hole and a shank part, the drill part and the shank part being made of different materials, the method comprising:

forming a drill part-forming powder compact having a recess in one end thereof, and forming a shank part-forming powder compact having a protrusion, the protrusion intended to be fitted into the recess of the drill part-forming powder compact;

forming an assembly of the drill part-forming powder compact and the shank part-forming powder compact, with the protrusion fitted into the recess; and simultaneously sintering the assembly of the drill part-forming powder compact and the shank part-forming powder compact, wherein a size of an inner diameter of the recess formed in the drill part-forming powder compact and a size of an outer diameter of the protrusion formed in the shank part-forming powder compact are determined such that the inner diameter of the recess becomes smaller than the outer diameter of the protrusion after the powder compacts are sintered.

2. The method according to claim 1, wherein the drill part-forming powder compact contains at least one selected from the group consisting of tungsten carbide powder, cobalt powder, and cermet powder, and the shank part-forming powder compact contains iron-based alloy powder that has a post-sintering hardness of 300 Hv or more.

3. The method according to claim 1, wherein the drill part-forming powder compact is formed using powder injection molding.

4. The method according to claim 1, wherein the drill part-forming powder compact includes a drill blade portion and a connecting portion, the connecting portion having a diameter that is greater than that of the drill blade portion, and the recess is formed in one end of the connecting portion.

5. The method according to claim 4, further comprising forming a drill blade by machining the drill blade portion of the micro drill after sintering the assembly.

* * * * *